(12) United States Patent
Arefeen et al.

(10) Patent No.: US 7,224,140 B2
(45) Date of Patent: May 29, 2007

(54) METHOD OF STALL DETECTION FOR STEPPER MOTOR SYSTEM

(75) Inventors: Mohammed S. Arefeen, Houston, TX (US); Jim D. Childers, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/343,314

(22) Filed: Jan. 31, 2006

(65) Prior Publication Data

US 2006/0181237 A1 Aug. 17, 2006

Related U.S. Application Data

(60) Provisional application No. 60/648,797, filed on Jan. 31, 2005.

(51) Int. Cl.
*G05B 19/40* (2006.01)
(52) U.S. Cl. .................. 318/685; 318/671; 318/560
(58) Field of Classification Search ............... 318/685, 318/696, 671, 560
See application file for complete search history.

(56) References Cited

U.S. PATENT DOCUMENTS

| 5,378,975 | A | * | 1/1995 | Schweid et al. ............ 318/685 |
| 5,821,713 | A | * | 10/1998 | Holling et al. ............ 318/439 |
| 6,307,726 | B1 | * | 10/2001 | Marshall et al. ........... 361/93.9 |
| 6,667,595 | B2 | * | 12/2003 | Wiseman .................... 318/696 |
| 6,681,817 | B2 | * | 1/2004 | Hagano et al. ............. 141/348 |
| 6,861,817 | B2 | * | 3/2005 | Pigott et al. ................ 318/685 |
| 2004/0032231 | A1 | * | 2/2004 | Ellerthorpe et al. ........ 318/254 |
| 2004/0222779 | A1 | * | 11/2004 | Cock et al. .............. 324/76.77 |

* cited by examiner

*Primary Examiner*—Rita Leykin
(74) *Attorney, Agent, or Firm*—Robert D. Marshall, Jr.; W. James Brady; Frederick J. Telecky, Jr.

(57) ABSTRACT

This invention detects a stall in a stepper motor by determining a motor winding current for each stepper pulse and determining if the winding current of a particular stepper pulse meets predetermined criteria. The motor winding current may be determined by measuring a voltage across an ON field effect transistor during a stepper pulse and calculating a winding current using an assumed ON field effect transistor resistance. The predetermined criteria may by a calculated motor winding current greater than a predetermined threshold, greater than prior pulse by more than a predetermined threshold or greater than a prior pulse by more than a predetermined factor.

9 Claims, 3 Drawing Sheets

METHOD OF STALL DETECTION FOR STEPPER MOTOR SYSTEM

CLAIM OF PRIORITY

This application claims priority under 35 U.S.C. 119(e)(1) to U.S. Provisional Application No. 60/648,797 filed Jan. 31, 2005.

TECHNICAL FIELD OF THE INVENTION

The technical field of this invention is stepper motor drive circuits and more to stepper motor stall detection.

BACKGROUND OF THE INVENTION

Detection of the zero/home position of a stepper motor enables accurate position calibration. Detection of this zero/home position typically involves stepper motor stall detection.

The current method of stall detection measures the back-EMF voltage of a motor phase which is not active. The measurement of back-EMF voltage at low speed is difficult and not very accurate. Therefore there is need for a better manner of stepper motor stall detection.

SUMMARY OF THE INVENTION

The technique detects the variation of the active phase current slope to determine a stepper motor stall.

BRIEF DESCRIPTION OF THE DRAWINGS

These and other aspects of this invention are illustrated in the drawings, in which.

DETAILED DESCRIPTION OF PREFERRED EMBODIMENTS

This method measures the current slope of an active phase of the stepper motor. The difference in the slope of the phase current of an active phase from running and stalling provides an accurate and simpler but effective detection of a stall.

Figure 1:
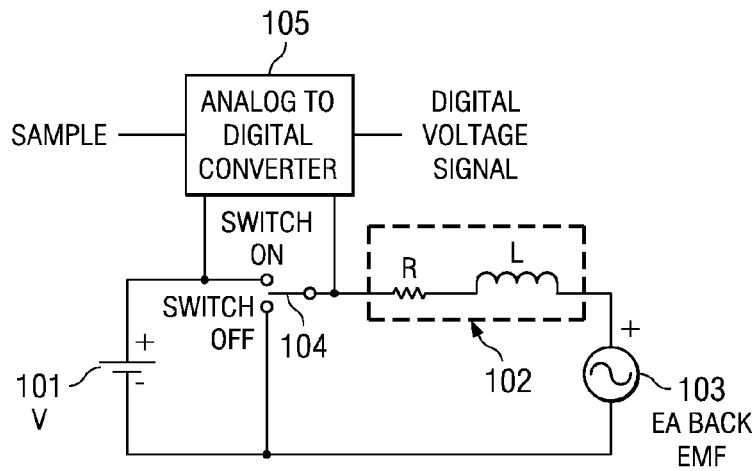
FIG. 1 illustrates a model of s stepper motor drive circuit used to explain the concepts of this invention.

FIG. 1 shows stepper motor winding model and the operation of the H-bridge MOSFETs. Voltage source 101 is supplied to motor winding 102, including both a resistive component R and an inductive component L, and a back electromotive force (back-EMF) source 103 via switch 104. Switch 104 represents the field effect transistors (FETs) performing the switching operations. During ON operation of switch 104, motor winding 102 is supplied by voltage source 101. The winding current starts building up in winding inductor L. The winding current is opposed by the motor back-EMF voltage Ea 103. Analog to digital converter 105 senses the voltage across switch 104 when triggered by the sample signal and generates a digital voltage signal.

During the ON operation of the MOSFET switch, the phase current can be written as $$I(t) = (V - Ea)(1 - e^{-tR/L}) \quad (1)$$

where: I(t) is the current as a function of time; V is the drive voltage; Ea is the back electromotive force (EMF) voltage; R is the stepper motor winding resistance; and L is the stepper motor winding inductance.

Figure 2:
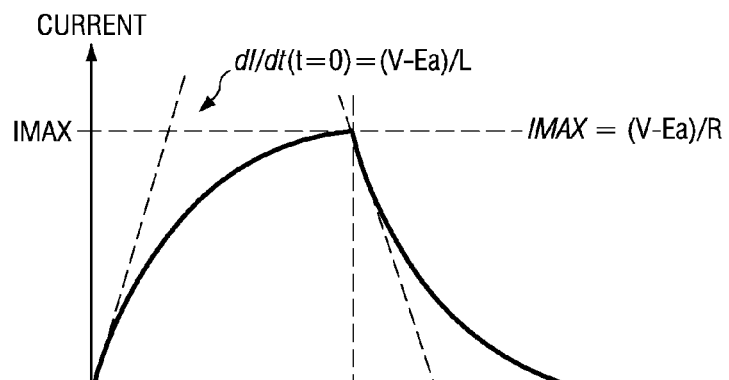
FIG. 2 illustrates a typical current waveform during stepper motor drive.

FIG. 2 shows a typical phase current waveform. The slope of the current depends on the supply voltage V, the back-EMF Ea and the motor winding parameters, resistance R and inductance L. The back-EMF of the motor depends on the rotational speed of the motor and is zero at zero speed.

When the stepper motor is rotating at a constant speed the slope of the currents will stay the same at every ON instant of the phase current. At the instant the motor hits a mechanical STOP, back-EMF 103 of the motor reduces to zero because the motor is stopped. The current build-up in the active phase of the motor is no longer influenced by back-EMF 103 and the phase current of the winding can be written by putting Ea=0 in equation (1) as $$I(t) = V(1 - e^{-tR/L}) \quad (2)$$

This changes the slope of the current from (V−Ea)/L to V/L.

Figure 3:
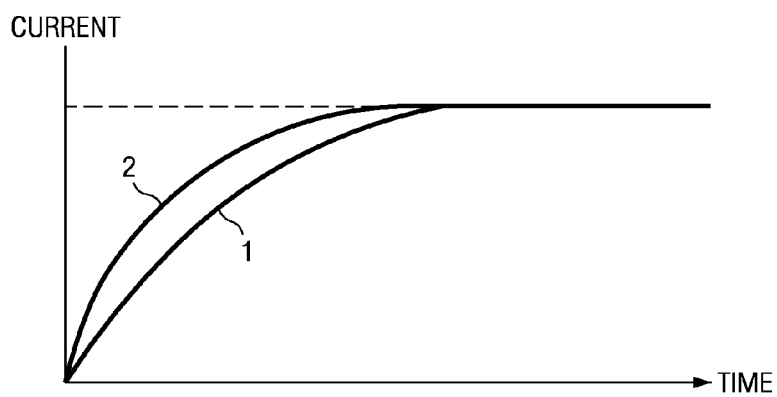
FIG. 3 illustrates the difference in stepper motor current during normal operation and a stall condition.

FIG. 3 illustrates the current build up in these two cases. Curve 301 is the current slope when the motor is rotating at a certain rotational speed. Curve 302 is the current slope when the motor has stopped at a mechanical block.

Figure 4:
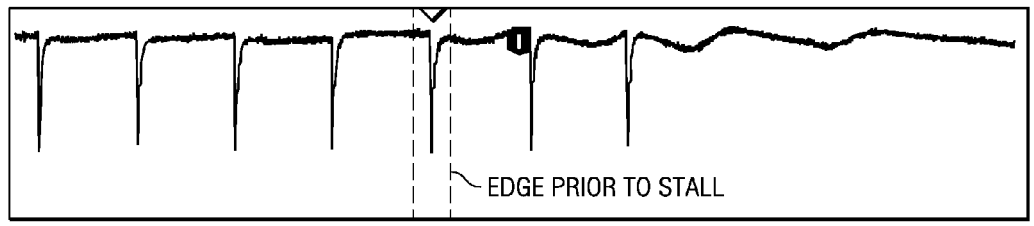
FIG. 4 illustrates a plurality of stepper motor pulses including pulses before and after a stall.

In order to determine motor stall, the system controller calculates the current slope after every ON state. The motor current is typically measured by measuring the voltage across one of the power FETs. When ON the FET has a small but not zero resistance. Measuring the voltage across the FET when ON together with the known ON resistance permits calculation of the motor winding current. FIG. 4 illustrates a typical measured stepper motor winding current sensing voltage while for plural stepper pulses including pulses before and after a stall. The marked stepper pulse corresponds to when the motor stalls.

Figure 5:
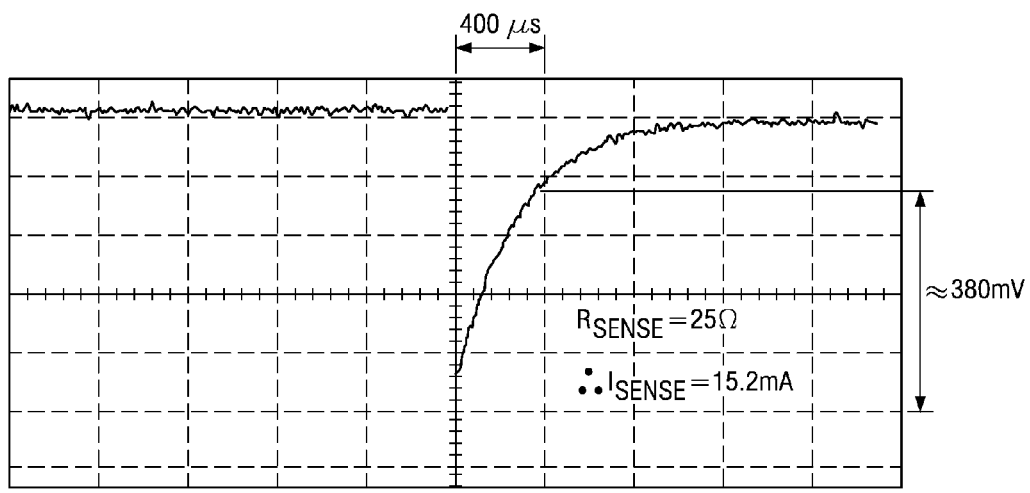
FIG. 5 illustrates an expanded time view of the stepper motor voltage during normal operation.

FIG. 5 shows a sensed voltage for the running case before stalling. The voltage sensed by analog to digital converter 105 as triggered by a sample signal 400 μS after the FET (switch 104) is turned ON is 380 mV. In this example, this voltage is sensed across a 25 ohm ON resistance FET driving the motor winding. The current is calculated to be 15.2 mA.

Figure 6:
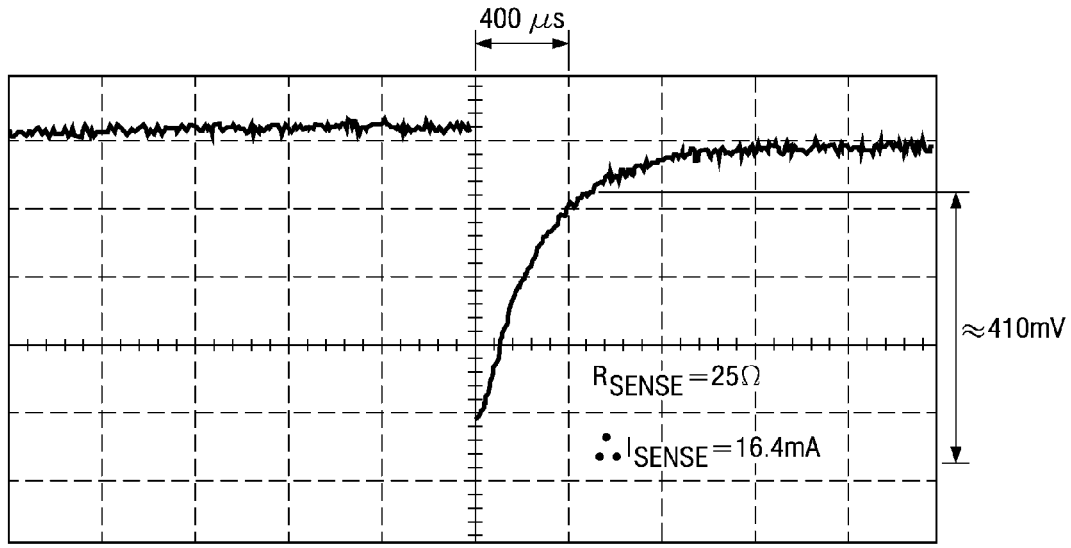
FIG. 6 illustrates an expanded time view of the stepper motor voltage upon a stall.

FIG. 6 shows a similar stepper motor winding current when the motor is stalled such as at a stop. The voltage sensed by analog to digital converter 105 as triggered by a sample signal 400 μS after the FET (switch 104) is turned ON under similar sensing conditions is 410 mV. The calculated current is 16.4 mA. This difference in sensed current is $$\frac{16.4 \text{ mA}}{15.2 \text{ mA}} = 1.078 \quad (3)$$

or nearly 8%. This difference in current would generally be easy to detect. Generally the stepper motor drive circuit would deenergize the motor thereby ensuring an accurate home position for the motor.

Figure 7:
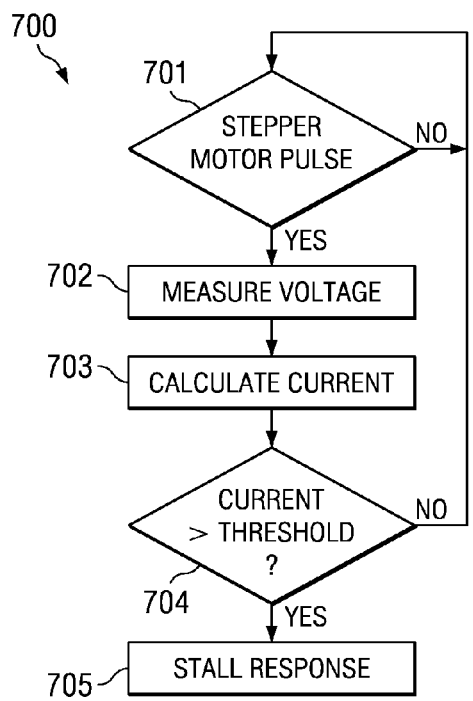
FIG. 7 illustrates a flow chart of this invention.

FIG. 7 illustrates process 700 according to this invention. Test block 701 checks to determine if there is a new stepper motor pulse attempting to drive the stepper motor one more step. If not (No at test block 701), process block 700 loops back to test block 701 to again test for a stepper pulse. If there is a stepper pulse (Yes at test block 701), then block 702 measures the voltage across an ON FET. It is typical to sample the voltage across the ON FET (switch 104) and generate a digital voltage signal via an analog-to-digital converter (ADO) 105. Block 703 then calculates the winding current. This calculation is made as follows:

$$I = V/R \qquad (5)$$

where: I is the winding current to be calculated; V is the measured voltage across the FET; and R is the ON resistance of the FET.

Test block 704 determines if the calculated current exceeds a predetermined threshold. If not (No at test block 704), the process 700 loops back to test block 701 to await another stepper pulse. If so (Yes at test block 704), then a stall condition is detected. Block 705 represents a stall response. This stall response could be ceasing further stepper pulses, triggering an alarm or another response. The 8% difference in running current versus stalled current permits using a fixed threshold. This fixed threshold is set greater than the expected running current and less than the expected stalled current. In the example of FIGS. 4 to 6, this threshold would be between 15.2 mA and 16.4 mA. Another stall test would compare the last two calculated currents and determine a stall if the two differ by more than a predetermined amount or by more than a predetermined factor.

What is claimed is:

1. A method of stall detection in a stepper motor comprising the steps of:
    determining a motor winding current for each stepper pulse applied to the stepper motor at a predetermined time after start of the stepper pulse;
    detecting a stall if the determined motor winding current of a particular stepper pulse is greater than a predetermined threshold.

2. The method of claim 1, wherein:
    said step of determining a motor winding current at the predetermined time after start of the stepper pulse includes
        measuring a voltage across an ON field effect transistor at the predetermined time after start of the stepper pulse, and
        calculating a winding current from said measured voltage and an assumed ON field effect transistor resistance.

3. A method of stall detection in a stepper motor comprising the steps of:
    determining a motor winding current for each stepper pulse applied to the stepper motor a predetermined time after start of the stepper pulse;
    detecting a stall if the determined motor winding current of a particular stepper pulse is greater than a determined motor winding current of an immediately prior pulse by more than a predetermined threshold.

4. A method of stall detection in a stepper motor comprising the steps of:
    determining a motor winding current for each stepper pulse applied to the stepper motor a predetermined time after start of the stepper pulse;
    detecting a stall if the determined motor winding current of a particular stepper pulse is greater than a determined motor winding current of an immediately prior pulse by more than a predetermined factor.

5. The method of claim 1, wherein:
    the predetermined time is 400 µS.

6. The method of claim 3, wherein:
    said step of determining a motor winding current at the predetermined time after start of the stepper pulse includes
        measuring a voltage across an ON field effect transistor at the predetermined time after start of the stepper pulse, and
        calculating a winding current from said measured voltage and an assumed ON field effect transistor resistance.

7. The method of claim 3, wherein:
    the predetermined time is 400 µS.

8. The method of claim 4, wherein:
    said step of determining a motor winding current at the predetermined time after start of the stepper pulse includes
        measuring a voltage across an ON field effect transistor at the predetermined time after start of the stepper pulse, and
        calculating a winding current from said measured voltage and an assumed ON field effect transistor resistance.

9. The method of claim 4, wherein:
    the predetermined time is 400 µS.

* * * * *